Jan. 20, 1959          K. J. KLENK          2,869,235

HAND SHEAR FOR CUTTING PLASTIC LAMINATE

Filed Aug. 20, 1958

INVENTOR.
KARL J. KLENK
BY
ATTORNEY

United States Patent Office 2,869,235
Patented Jan. 20, 1959

2,869,235

HAND SHEAR FOR CUTTING PLASTIC LAMINATE

Karl J. Klenk, Chadds Ford, Pa.

Application August 20, 1958, Serial No. 756,203

4 Claims. (Cl. 30—252)

The invention herein disclosed is a tool of the hand shear type for cutting hard, brittle plastic laminate such as Formica and the like.

These hard brittle materials have usually been cut with a saw, a slow, laborious and many times difficult awkward inaccurate operation.

Objects of the invention are to provide an easily operated hand tool capable of performing these operations and one which will be of simple practical efficient construction, produced at reasonable cost and which, with ordinary hand gripping action, will exert all necessary power for heavy cutting purposes and which with normal care can be used to accurately cut and trim the hard plastic materials referred to.

Other desirable objects and the novel features through which the purpose of the invention are attained are set forth or will appear in the course of the following specification.

The drawing accompanying and forming part of the specification illustrates a present commercial embodiment of the invention. Structure, however, may be modified and changed, all within the true intent and scope of the invention as hereinafter defined and claimed.

Fig. 1 in the drawing is a front end elevation of one of the shears, the handles shown broken away at the top.

The tool shown comprises a pair of handles or hand levers 7 and 8 pivotally connected together at their forward ends 9 and a pair of cutting blades 10 and 11 actuated by the hand levers and constructed and arranged to cut hard brittle material.

Figure 1:
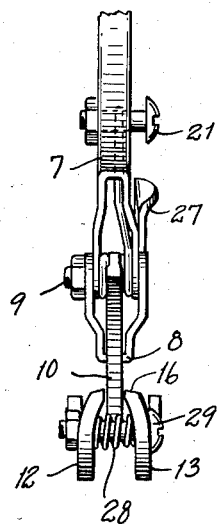

The upper blade 10 is a single blade and the lower blade 11 is made up of companion blade bars 12, 13 spaced, as shown in Fig. 1, to accommodate the single blade between them.

The upper and lower blades are pivotally connected intermediate their ends by a pivot bolt 14 and are provided with companion cutting edges 15, 16 forward of the pivot and leverage extensions 17, 18 rearwardly of the pivot.

The handles are shown as made up of folded sheet metal providing hollow U-shaped cross section.

The rearward extension 17 of the upper blade is shown entered in the hollow of the lower hand lever 8 and pivotally secured therein at 19.

The lower pair of blades, constituting the lower jaw 11 are pivotally connected with the upper hand lever 7 by a link 20 pivotally connected at the upper end at 21 in the hollow of the upper hand lever and pivotally connected at the lower end at 22 between the rearward leverage extensions 18 of the lower blade.

The intermediate portion of this connecting push link extends through and may be slidingly guided in a slot 23 in the lower hand lever.

Figure 2:
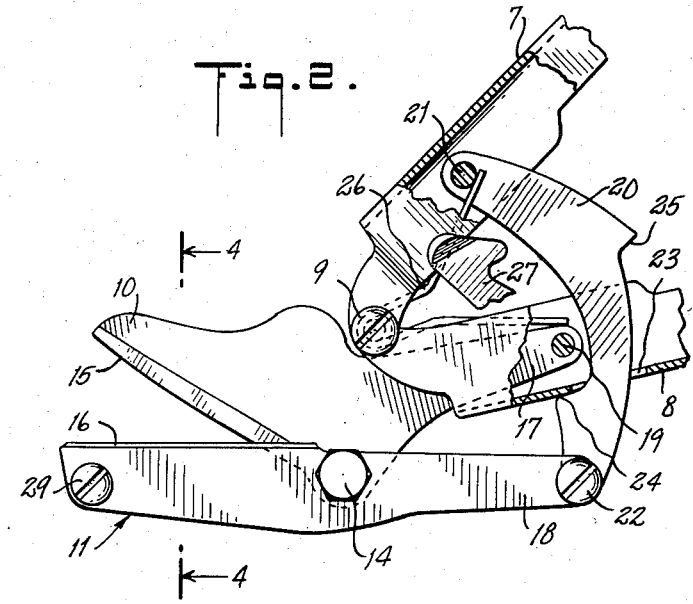
Fig. 2 is a broken part section side elevation showing the blades or jaws in open relation.
Figure 3:
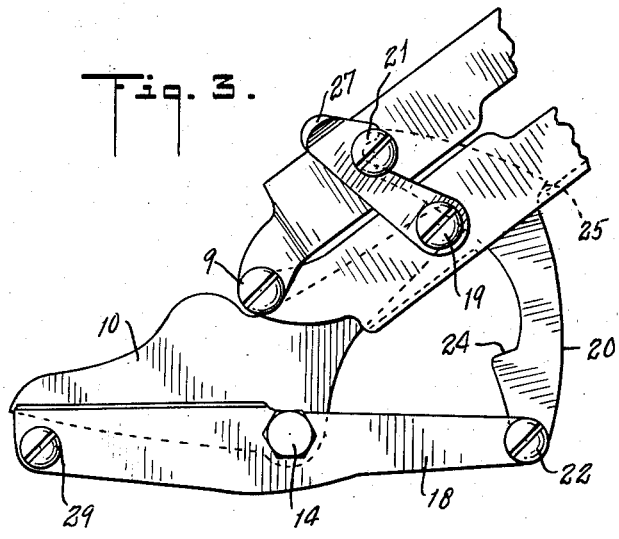
Fig. 3 is a broken side view showing the jaws closed.

Link 20 serves a further purpose, being provided with a shoulder 24 on the forward edge engageable with the underside of the lower hand lever to limit opening movement of the tool, Fig. 2, and with a shoulder 25 on the back edge engageable with the inner surface of the hollow lower lever as in Fig. 3 to limit closing movement of the jaws.

A spring 26 coiled about the handle pivot 9 and bearing against link pivot 21 and leverage extension 17 applies tension to open the hand grip levers and the jaws or blades as indicated in Fig. 2.

A latch 27 mounted on the pivot 19 for the upper jaw extension and engageable over the upper link pivot stud 21 serves for securing the jaws and hand levers in the closed relation shown in Fig. 3.

Figure 4:
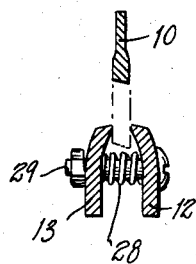
Fig. 4 is a vertical sectional view across the blades on substantially the plane of line 4—4 of Fig. 2.

The lower blade bars 12, 13 are shown in Figs. 1 and 4 as hollow ground and as yieldingly held in spaced apart relation at their forward ends by an interposed spring 28 on a connecting bolt 29.

The leverage applied to the companion jaws or blades by hand levers 7 and 8 and the push link connecting the upper hand lever with the lower blade is sufficient to cause the blades to readily cut through hard brittle plastic and other such materials heretofore requiring the use of a saw or the like tool. This work can be accurately performed because the blades are forward of the handles, in plain sight for all cutting operations. The tool consists of a few sturdy parts which can be produced and assembled at reasonable cost.

In the closing movement of the blades, in traveling from the Fig. 2 to the Fig. 3 position the handle pivot 9 swings in an arc over the blade pivot 14, with the push link swinging on the lower pivot 22, assisting and controlling this movement.

The spring spacer 28 between the forward ends of the lower blade bars and screw stud 29 enable ready adjustment of these bars to take up any wear or to adjust the cutter to various materials or thickness of materials.

What is claimed is:

1. Hand shear for cutting hard brittle material comprising companion upper and lower blades pivotally connected intermediate their ends, with cutting edges forward of the pivotal connection and leverage extensions rearward of said pivotal connection, a pair of hand levers above and rearwardly of said blades, said hand levers being pivotally connected at their forward ends at a point above the pivotal connection of the blades, said rearward leverage extension of the upper blade being pivotally connected with the lower hand lever and a push link pivotally connected with said upper hand lever and with the rearward leverage extension of the lower blade.

2. Hand shear for cutting hard brittle material comprising companion upper and lower blades pivotally connected intermediate their ends, with cutting edges forward of the pivotal connection and leverage extensions rearward of said pivotal connection, a pair of hand levers above and rearwardly of said blades, said hand levers being pivotally connected at their forward ends at a point above the pivotal connection of the blades, said rearward leverage extension of the upper blade being pivotally connected with the lower hand lever and a push link pivotally connected with said upper hand lever and with the rearward leverage extension of the lower blade, said lower blade being made up of spaced blade bars and said upper blade being a single blade disposed between said blade bars and said push link being disposed at its lower end between said blade bars.

3. Hand shear for cutting hard brittle material comprising companion upper and lower blades pivotally connected intermediate their ends, with cutting edges forward of the pivotal connection and leverage extensions rearward of said pivotal connection, a pair of hand levers above and rearwardly of said blades, said hand levers being pivotally connected at their forward ends at a point above the pivotal connection of the blades, said rearward leverage extension of the upper blade being pivotally connected with the lower hand lever and a push link pivotally connected with said upper hand lever and with the rearward leverage extension of the lower blade, said hand levers being of hollow U-shape cross section with the upper end of said push link disposed in the hollow of the upper hand lever, the lower hand lever having a slot through which said push link extends and said push link having shoulders on opposite edges of the same engageable with opposite sides of said lower hand lever to limit opening and closing movements of the tool.

4. Hand shear for cutting hard brittle material comprising companion upper and lower blades pivotally connected intermediate their ends, with cutting edges forward of the pivotal connection and leverage extensions rearward of said pivotal connection, a pair of hand levers above and rearwardly of said blades, said hand levers being pivotally connected at their forward ends at a point above the pivotal connection of the blades, said rearward leverage extension of the upper blade being pivotally connected with the lower hand lever and a push link pivotally connected with said upper hand lever and with the rearward leverage extension of the lower blade, said lower blade being made up of spaced apart blade bars of opposed concave cross section, a screw stud securing the ends of said blade bars together and a spring on said screw stud between the bars.

No references cited.